United States Patent
Masubuchi

(10) Patent No.: US 7,030,189 B2
(45) Date of Patent: Apr. 18, 2006

(54) THERMOPLASTIC ELASTOMER RESIN COMPOSITION

(75) Inventor: Naganori Masubuchi, Tokyo (JP)

(73) Assignee: Riken Technos Corp., Tokyo (JP)

( * ) Notice: Subject to any disclaimer, the term of this patent is extended or adjusted under 35 U.S.C. 154(b) by 0 days.

(21) Appl. No.: 10/295,031

(22) Filed: Nov. 15, 2002

(65) Prior Publication Data

US 2003/0216507 A1 Nov. 20, 2003

(30) Foreign Application Priority Data

May 13, 2002 (JP) ............................. 2002-137251

(51) Int. Cl.
*C08L 75/04* (2006.01)
(52) U.S. Cl. ........................................ 525/125; 525/66
(58) Field of Classification Search .................. 525/66, 525/125
See application file for complete search history.

(56) References Cited

FOREIGN PATENT DOCUMENTS

| EP | 0347794 A1 | 12/1989 |
|---|---|---|
| EP | 0569746 A1 | 11/1993 |
| EP | 0621311 A2 | 10/1994 |
| JP | 3-234755 | 10/1991 |
| JP | 2001-253980 | * 9/2001 |

OTHER PUBLICATIONS

European Search Report dated Aug. 4, 2003.

* cited by examiner

*Primary Examiner*—Jeffrey B. Robertson
(74) *Attorney, Agent, or Firm*—Armstrong, Kratz, Quintos, Hanson & Brooks, LLP

(57) ABSTRACT

The present invention is a thermoplastic elastomer resin composition comprising (A) 50 to 90% by weight of a urethane-based thermoplastic elastomer; (B) 5 to 45% by weight of polar group-containing thermoplastic elastomer; and (C) 5 to 45% by weight of a thermoplastic elastomer, and a shaped article, which is excellent in moldability, oil resistance scratch and softness.

18 Claims, No Drawings

THERMOPLASTIC ELASTOMER RESIN COMPOSITION

BACKGROUND OF THE INVENTION

1. Field of the Invention

The present invention relates to a thermoplastic elastomer resin composition and a formed article of the same. More particularly, the present invention relates to a thermoplastic elastomer resin composition comprising a urethane-based thermoplastic elastomer and a formed article of the same.

2. Description of the art

Recently, thermoplastic elastomers, which are soft materials with rubber elasticity, need no vulcanization, and are as moldable and recyclable as thermoplastic resins, have been extensively used into various areas, such as automobile parts, home electric appliances, wire coatings, medical equipment parts, footwear and miscellaneous goods.

As examples of conventional thermoplastic elastomers, a urethane-based thermoplastic elastomer, an olefin-based thermoplastic elastomer, a polyester-based thermoplastic elastomer, a polyvinyl chloride-based thermoplastic elastomer and the like have been developed and come onto market.

Among these thermoplastic elastomers, a urethane-based thermoplastic elastomer is excellent in scratch resistance, oil resistance, heat resistance, abrasion resistance and the like. However, this elastomer exhibits a hardness (HDA) of approximately 80 or more, so that the softness of this elastomer is limited. Further, in a molten state, the viscosity of this elastomer becomes drastically low. For this reason, this elastomer has a disadvantage in that it is difficult to form this elastomer into a thick article by injection molding or the like.

Conventional methods for modifying a urethane-based thermoplastic elastomer are disclosed in the following documents. Unexamined Japanese Patent Application Laid-Open Specification Nos. 6-65467 and 6-107898 disclose a resin composition obtained by melt-blending a urethane-based thermoplastic elastomer with a styrene block copolymer (and/or a hydrogenation product obtained by hydrogenating the styrene block copolymer). Each of Unexamined Japanese Patent Application Laid-Open Specification Nos. 3-234745, 3-234755, 5-171003 and 7-126474 discloses a resin composition comprising a urethane-based thermoplastic elastomer and a hydrogenated styrene block copolymer having a carboxyl group or derivative thereof. Unexamined Japanese Patent Application Laid-Open Specification No. 2-97554 discloses a resin composition comprising a urethane-based thermoplastic elastomer and a hydrogenated styrene block copolymer having an epoxy group or derivative thereof. However, although these resin compositions exhibit a certain extent of softness, these resin compositions does not have desired balances between permanent compression set and hardness. Further, the compatibility among the components of these resin compositions is unsatisfactory. As a result, these resin compositions have a problem in that the abrasion resistance thereof is low.

It is conceivable that in order to impart a moldability and softness to a urethane-based thermoplastic elastomer, a urethane-based thermoplastic elastomer is mixed with another thermoplastic elastomer. However, the compatibility between the thermoplastic elastomer and the urethane-based thermoplastic elastomer is unsatisfactory. As a result, the resultant resin composition has a problem in that the scratch resistance thereof is extremely lowered.

In view of the above-mentioned problems, it is an object of the present invention to provide a thermoplastic elastomer resin composition comprising a urethane-based thermoplastic elastomer and another thermoplastic elastomer, which is excellent in moldability, oil resistance, scratch resistance and softness.

SUMMARY OF THE INVENTION

In order to solve the above-mentioned problems, the inventors have made extensive and intensive studies. As a result, it has unexpectedly been found that, when specific amounts of a polar group-containing thermoplastic elastomer and thermoplastic elastomer are mixed with a urethane-based thermoplastic elastomer, the resultant thermoplastic elastomer resin composition is possible to impart a moldability and softness to a urethane-based thermoplastic elastomer without any loss of a scratch resistance of the urethane-based thermoplastic elastomer. The present invention has been completed based on the above novel finding.

A first aspect of the invention is a thermoplastic elastomer resin composition comprising:
(A) 50 to 90% by weight of a urethane-based thermoplastic elastomer;
(B) 5 to 45% by weight of a polar group-containing thermoplastic elastomer; and
(C) 5 to 45% by weight of a thermoplastic elastomer.

A second aspect of the invention is the composition according to the first aspect, wherein said elastomer (B) is a rubber elastomer having at least one polar group selected from the group consisting of a carboxyl group, a carbonyl group, an acid anhydride group, an amino group, a hydroxyl group, a glycidyl group and an oxazolyl group.

A third aspect of the invention is the composition according to the first or second aspect, wherein said elastomer (B) is obtained by melt-kneading a mixture of:
(a) a rubber elastomer;
(b) a compound having at least one polar group selected from the group consisting of a carboxyl group, a carbonyl group, an acid anhydride group, an amino group, a hydroxyl group, a glycidyl group and an oxazolyl group; and
(c) an organic peroxide.

A fourth aspect of the invention is the composition according to the third aspect, wherein said rubber elastomer (a) is at least one member selected from the group consisting of:
(a-1) at least one block copolymer selected from the group consisting of:
  a block copolymer comprising at least one polymer block A composed mainly of an aromatic vinyl compound and at least one polymer block B composed mainly of a conjugated diene compound;
  a hydrogenated block copolymer obtained by hydrogenating said block copolymer; and
(a-2) an ethylene-based rubber copolymer.

A fifth aspect of the invention is the composition according to the fourth aspect, wherein said block copolymer (a-1) satisfying the following requirements:
  the content of the aromatic vinyl compound is 50% by weight or less;
  the number average molecular weight Mn is 5,000 to 1,500,000; and
  the polydispersity is 10 or less.

A sixth aspect of the invention is the composition according to the fourth aspect, wherein said hydrogenated block copolymer (a-1) obtained by hydrogenating at least one block copolymer selected from the group consisting of a styrene-isoprene/butadiene-styrene block copolymer and a styrene-isoprene-styrene block copolymer, in which the hydrogenation ratio of the olefinically unsaturated bond is 60% or more.

A seventh aspect of the invention is the composition according to the fourth aspect, wherein said copolymer (a-2) is an ethylene-α-olefin copolymer rubber.

A eighth aspect of the invention is the composition according to the fourth aspect, wherein said copolymer (a-2) is a rubber elastomer selected from the group consisting of an ethylene-propylene copolymer rubber, an ethylene-butene copolymer rubber, an ethylene-propylene-diene copolymer rubber and an ethylene-α-olefin copolymer synthesized in the presence of a single-site catalyst.

A ninth aspect of the invention is the composition according to the third aspect, wherein said compound (b) is at least one compound selected from the group consisting of:
(b-1) an unsaturated carboxylic acid or a derivative thereof;
(b-2) a liquid polybutadiene having at least one terminal hydroxyl group; and
(b-3) an unsaturated glycidyl group-containing compound or a derivative thereof.

A tenth aspect of the invention is the composition according to the second, wherein said elastomer (B) is obtained by melt-kneading a mixture of:
(a) 100 parts by weight of a rubber elastomer;
(b) at least one compound selected from the group consisting of:
(b-1) 0.01 to 15 parts by weight of an unsaturated carboxylic acid or a derivative thereof,
(b-2) 1 to 30 parts by weight of a liquid polybutadiene having at least one terminal hydroxyl group, and
(b-3) 0.01 to 15 parts by weight of an unsaturated glycidyl group-containing compound or a derivative thereof; and
(c) 0.01 to 3.5 parts by weight of an organic peroxide.

A eleventh aspect of the invention is the composition according to the tenth aspect, wherein said elastomer (B) further comprises, per 100 parts by weight of said rubber elastomer (a), at least one member selected from the group consisting of:
(d) 20 to 240 parts by weight of a non-aromatic-based softening agents for rubber;
(e) 1 to 100 parts by weight of a peroxide-decomposable polyolefin resin; and
(f) 0 to 100 parts by weight of a peroxide-crosslinkable polyolefin resin.

A twelfth aspect of the invention is the composition according to the first aspect, wherein said thermoplastic elastomer (C) is at least one thermoplastic elastomer selected from the group consisting of (C-1) an olefin-based elastomer and (C-2) a styrene-based elastomer.

A 13th aspect of the invention is the composition according to the twelfth invention, wherein said olefin-based elastomer (C-1) is an ethylene-α-olefin copolymer rubber.

A 14th aspect of the invention is the composition according to the twelfth or 13th aspect, wherein said olefin-based elastomer (C-1) being at least one member selected from the group consisting of an ethylene-propylene copolymer rubber, an ethylene-butene copolymer rubber and an ethylene-α-olefin copolymer synthesized in the presence of a single-site catalyst.

A 15th aspect of the invention is the composition according to the twelfth aspect, wherein said styrene-based elastomer (C-2) is at least one member selected from the group consisting of a styrene-butadiene-styrene copolymer (SBS), a styrene-isoprene-styrene copolymer (SIS), a styrene-isoprene/butadiene-styrene copolymer (SIBS), a styrene-ethylene/butene-styrene copolymer (SEBS), styrene-ethylene/propylene-styrene copolymer (SEPS), a styrene-ethylene/ethylene/propylene-styrene copolymer (SEEPS) and a partially hydrogenated styrene-butadiene-styrene copolymer (SBBS).

A 16th aspect of the invention is a shaped article formed by molding the composition of the first aspect.

A 17th aspect of the invention is a grip comprising the shaped article of the 16th aspect.

An 18th aspect of the invention is a switch comprising the shaped article of the 16th aspect.

A 19th aspect of the invention is an arm rest comprising the shaped article of the 16th aspect.

A 20th aspect of the invention is a skin comprising the shaped article of the 16th aspect.

A 21st aspect of the invention is a buckle comprising the shaped article of 16th aspect.

A 22nd aspect of the invention is a cushioning medium comprising the shaped article of the 16th aspect.

DETAILED DESCRIPTION OF THE INVENTION

The thermoplastic elastomer resin composition of the present invention is described in more detail for its components, method of production, purposes and so on.

1. Components of the Thermoplastic Elastomer Resin Composition

The thermoplastic elastomer resin composition of the present invention comprises (A) a thermoplastic urethane elastomer, (B) a polar group-containing thermoplastic elastomer, (C) a thermoplastic elastomer having no polar group and, if desired, (D) an inorganic filler.

(1) Urethane-Based Thermoplastic Elastomer (A)

Generally, the urethane-based thermoplastic elastomer (TPU) as component (A) used in the thermoplastic elastomer resin composition of the present invention is prepared from a polyol, a diisocyanate and a chain extender. Examples of polyols include a polyester polyol, a polyesterether polyol, a polycarbonate polyol and a polyether polyol.

Examples of polyester polyols include a polyester polyol obtained by dehydration-condensation reaction of a dicarboxylic acid (for example, an aliphatic dicarboxylic acid, such as succinic acid, adipic acid, sebacic acid and azelaic acid; an aromatic dicarboxylic acid, such as phthalic acid, isophthalic acid, terephthalic acid and naphthalenedicarboxylic acid; and an alicyclic dicarboxylic acid, such as hexahydrophthalic acid, hexahydroterephthalic acid and hexahydroisophthalic acid) or corresponding ester or acid anhydride with a diol (such as ethylene glycol, 1,3-propylene glycol, 1,2-propylene glycol, 1,3-butanediol, 1,4-butanediol, 1,5-pentanediol, 1,6-hexanediol, 3-methyl-1,5-pentanediol, neopentyl glycol, 1,3-octanediol, 1,9-nonanediol and a mixture thereof); and a polylactone diol obtained by ring-opening polymerization of a lactone monomer (such as ε-caprolactone).

As an example of a polycarbonate polyol, there can be mentioned a polycarbonate polyol obtained by the reaction between one or more polyhydric alcohol (such as ethylene glycol, 1,3-propylene glycol, 1,2-propylene glycol, 1,3-butanediol, 1,4-butanediol, 1,5-pentanediol, 1,6-hexanediol, 3-methyl-1,5-pentanediol, neopentyl glycol, 1,8-octanediol, 1,9-nonanediol and diethylene glycol) with a carbonate compound (such as diethylene carbonate, dimethyl carbonate and diethyl carbonate). Further, a copolymer of a polycaprolactone polyol (PCL) with a polyhexamethylene carbonate (PHL) also can be used.

Examples of polyesterether polyols include a polyesterether polyol obtained by dehydration-condensation reaction of a dicarboxylic acid (for example, an aliphatic dicarboxylic acid, such as succinic acid, adipic acid, sebacic acid and azelaic acid; an aromatic dicarboxylic acid, such as phthalic acid, isophthalic acid, terephthalic acid and naphthalenedicarboxylic acid; and an alicyclic dicarboxylic acid, such as hexahydrophthalic acid, hexahydroterephthalic acid and hexahydroisophthalic acid) or corresponding ester or acid anhydride with a glycol (such as diethylene glycol, an addition product of propylene oxide and a mixture thereof).

Examples of polyether polyols include a polyether polyol obtained by polymerization of a cyclic ether, such as a polyethylene glycol, a polypropylene glycol and a polytetramethylene ether glycol obtained by polymerization of ethylene oxide, propylene oxide and tetrahydrofuran, respectively. Further, copolyether of these monomers also can be used.

Among the above-mentioned polyols, in view of the resistance to hydrolysis, polyether polyols are preferred.

Examples of isocyanates include tolylene diisocyanate (TDI), 4,4'-diphenylmethane diisocyanate (MDI), 1,5-naphthylene diisocyanate (NDI), tolidine diisocyanate, 1,6-hexamethylene diisocyanate (HDI), isophorone diisocyanate (IPDI), xylylene diisocyanate (XDI), hydrogenated XDI, triisocyanate, tetramethylxylene diisocyanate (TMXDI), 1,6,11-undecane triisocyanate, 1,8-diisocyanomethyloctane, lysine ester triisocyanate, 1,3,6-hexamethylene triisocyanate, bicycloheptane triisocyanate and dicyclohexylmethane diisocyanate (hydrogenated MDI; HMDI). Among these isocyanates, 4,4'-diphenylmethane diisocyanate (MDI) is preferred.

As the above-mentioned chain extender, a low molecular weight polyol is used. Examples of such polyols include aliphatic polyols, such as ethylene glycol, 1,3-propylene glycol, 1,2-propylene glycol, 1,3-butanediol, 1,4-butanediol, 1,5-pentanediol, 1,6-hexanediol, 3-methyl-1,5-pentanediol, neopentyl glycol, 1,8-octanediol, 1,9-nonanediol, diethylene glycol and 1,4-cyclohexanedimethanol and glycerin; and aromatic polyols, such as 1,4-dimethylol-benzene, bisphenol A and an addition product obtained by addition of ethylene oxide or propylene oxide to bisphenol A.

The urethane-based thermoplastic elastomer does not include that of soluble grade, i.e., a urethane-based thermoplastic elastomer which exhibits a content of chloroform insoluble residue of 40% by weight or less, preferably 20% by weight or less, more preferably 10% by weight or less. Further, it is preferred that the Shore A hardness of the urethane-based thermoplastic elastomer is 95 or less.

The content of chloroform insoluble residue is obtained by the following manner. 0.2 g of a sample resin in the-form of pellets (3-mm cube) is extracted with 20 ml of chloroform at room temperature (23° C.) for 24 hours, followed by filtration. The resultant solid is dried, to thereby obtain chloroform insoluble residue. The content of chloroform insoluble residue is calculated from the weight of the obtained chloroform insoluble residue in accordance with the following formula:

Content (% by weight) of chloroform insoluble residue=(weight (g) of chloroform insoluble residue/weight (g) of sample resin) ×100

Specific examples of commercially available urethane-based thermoplastic elastomers include ester (lactone)-based polyurethane copolymers, such as C80A10 (manufactured and sold by Takeda Badische Urethane Industries, Ltd.) and C80A50 (manufactured and sold by Takeda Badische Urethane Industries, Ltd.); ester (adipate)-based polyurethane copolymers, such as T-5000V (manufactured and sold by DIC Bayer Polymer, Ltd.) and TR-3080 (manufactured and sold by DIC Bayer Polymer, Ltd.); ether-based polyurethane copolymers, such as 1180A50 (manufactured and sold by Takeda Badische Urethane Industries, Ltd.), T-8180 (manufactured and sold by DIC Bayer Polymer, Ltd.) and T-8283 (manufactured and sold by DIC Bayer Polymer, Ltd.); and ether/ester-based polyurethane copolymers, such as Desmopan DesKU2-88586 (manufactured and sold by DIC Bayer Polymer, Ltd.). These elastomers can be used individually or in combination.

Component (A) is incorporated in an amount of 50 to 90% by weight, preferably 60 to 80% by weight, based on the total weight of components (A), (B) and (C) taken as 100% by weight. At below 50% by weight, the abrasion resistance is lowered. At above 90% by weight, on the other hand, not only is the moldability deteriorated, but also the softness is rendered unsatisfactory.

(2) Polar Group-Containing Thermoplastic Elastomer (B)

Polar group-containing thermoplastic elastomer (B) used in the thermoplastic elastomer resin composition of the present invention functions as a compatibility agent for a urethane-based thermoplastic elastomer and thermoplastic elastomer, and is a rubber elastomer having at least one polar group selected from the group consisting of a carboxyl group, a carbonyl group, an acid anhydride group, an amino group, a hydroxyl group, a glycidyl group and an oxazolyl group.

It is preferred that component (B) is obtained by melt-kneading a mixture of:
(a) a rubber elastomer;
(b) a compound having at least one polar group selected from the group consisting of a carboxyl group, a carbonyl group, an acid anhydride group, an amino group, a hydroxyl group, a glycidyl group and an oxazolyl group;
(c) an organic peroxide.

Further, if desired, it is preferred that the mixture further comprises (d) a non-aromatic-based softening agents for rubber, (e) a peroxide-decomposable polyolefin resin, (f) a peroxide-crosslinkable polyolefin resin, (g) an ester-based crosslinking aid and the like, each of which is explained below.

Any material having rubber elasticity, such as a natural rubber, a diene-based synthetic rubber, a non diene-based synthetic rubber and the like, can be used as the above-mentioned rubber elastomer (a). Examples of such materials include a natural rubber (NR); a diene-based synthetic rubber, such as a polyisoprene rubber (IR), a polybutadiene rubber (BR), a poly(arylonitrile-butadiene) rubber (NBR), a chloroprene rubber (CR), a styrene-butadiene rubber (SBR), a styrene-butadiene-styrene rubber (SBS), a hydrogenated styrene-butadiene rubber (H-SBR), a styrene-ethylene/butene-styrene rubber (SEBS), a styrene-isoprene/butadiene-styrene rubber (SIBS), a hydrogenated styrene-isoprene/butadiene-styrene rubber (SEEPS), a partially hydrogenated styrene-butadiene-styrene rubber (SBBS), a styrene-isoprene-styrene rubber (SIS), a hydrogenated block copolymer of a conjugated diene compound, a block copolymer (CEBC) comprising a crystalline ethylene block and amorphous ethylene/butene block (obtained by hydrogenating a block copolymer of butadiene) and ABS; a non diene-based synthetic rubber, such as an ethylene-propylene rubber (EPR), an ethylene-butene rubber (EBR) and an ethylene-propylene-non-conjugated diene rubber (EPDM); an ethylene-α-olefin copolymer obtained using a metallocene catalyst; an acryl-based rubber (ACM or ANM); a fluororubber; a polyester-based (co)polymer (elastomer); and a polyamide/polyester-based (co)polymer (elastomer).

Among the above-mentioned examples of rubber elastomer (a), preferred are (a-1) a block copolymer comprising at least one polymer block A composed mainly of an aromatic vinyl compound and at least one polymer block B composed mainly of a conjugated diene compound; a hydrogenated block copolymer obtained by hydrogenating block copolymer (a-1) above; and (a-2) an ethylene-based rubber copolymer.

Examples of the above-mentioned block copolymers (a-1), each of which comprises at least one polymer block A composed mainly of an aromatic vinyl compound and at least one polymer block B composed mainly of a conjugated diene compound, and a hydrogenated block copolymer include block copolymers of an aromatic vinyl compound and conjugated diene compound, having the structure of A-B, A-B-A, B-A-B-A or A-B-A-B-A and hydrogenated block copolymers obtained by hydrogenating block copolymer above.

The above-mentioned block copolymer contains an aromatic vinyl compound in an amount of 5 to 60% by weight, preferably 20 to 50% by weight.

The polymer block A composed mainly of an aromatic vinyl compound may be composed only of the aromatic vinyl compound, or a copolymer block composed of an aromatic vinyl compound and a conjugated diene compound, wherein the amount of the aromatic vinyl compound in the copolymer block is 50% by weight or more, preferably 70% by weight or more.

The polymer block B composed mainly of a conjugated diene compound may be composed only of the conjugated diene compound, or a copolymer block composed of a conjugated diene compound and an aromatic vinyl compound, wherein the amount of the conjugated diene compound in the copolymer block is 50% by weight or more, preferably 70% by weight or more.

The block copolymer preferably has a number-average molecular weight (Mn) of 5,000 to 1,500,000, more preferably 10,000 to 550,000, still more preferably 100,000 to 400,000. The molecular weight distribution (Mw/Mn) is 10 or less. The molecular structure of the block copolymer may be of straight-chain, branched-chain, radial-chain or of an optional combination thereof.

In each of the polymer block A composed mainly of an aromatic vinyl compound and polymer block B composed mainly of a conjugated diene compound, the distribution of the aromatic vinyl compound or conjugated diene compound in the molecular chain may be represented by random, tapered configuration (the term "tapered configuration" means a configuration such that the concentration of certain monomer units contained in the polymer block does increasingly or decreasingly change along the length of the polymer chain), partial block or an combination thereof. When there are 2 or more polymer blocks A each composed mainly of an aromatic vinyl compound, they may be structurally the same or different, and so are polymer blocks B each composed mainly of a conjugated diene compound.

Examples of the aromatic vinyl compounds used for constructing the block copolymer include styrene, α-methylstyrene, vinyltoluene and p-tert-butylstyrene. They may be used either individually or in combination. Of the above compounds, styrene is more preferable. Examples of the conjugated diene compounds used for constructing the block copolymer include butadiene, isoprene, 1,3-pentadiene and 2,3-dimethyl-1,3-butadiene. They may be used either individually or in combination. Of the above compounds, butadiene, isoprene and a mixture of these compounds are more preferable.

The polymer block B (in a hydrogenated form) mainly based on a conjugated diene compound in hydrogenated block copolymer (a-1) is not limited in extent of hydrogenation. However, it is preferably 50% or more, more preferably 55% or more, still more preferably 60% or more. Its microstructure is also not limited. When the block B is composed of butadiene, for example, the 1,2-microstructure preferably accounts for 20 to 50% by weight, particularly preferably 25 to 45% by weight, in the polybutadiene block. The 1,2-bond may be selectively hydrogenated for the block. When the block B is composed of isoprene, preferably 70 to 100% by weight of isoprene in the polyisoprene block has the 1,4-microstructure, and preferably 90% or more of the aliphatic double bond derived from isoprene is hydrogenated.

When the hydrogenated block copolymer is used for specific purposes, the hydrogenated compound above can be preferably used, as required, for the purposes.

Specific examples of the block copolymers include a styrene-butadiene-styrene copolymer (SBS) and a styrene-isoprene-styrene copolymer (SIS). Specific examples of the hydrogenated block copolymers include a styrene-ethylene/butene-styrene copolymer (SEBS), a styrene-ethylene/propylene-styrene copolymer (SEPS), a styrene-ethylene/ethylene/propylene-styrene copolymer (SEEPS; in other words, a hydrogenated styrene-butadiene/isoprene-styrene copolymer) and a styrene-butadiene/butylene-styrene copolymer (partially hydrogenated styrene-butadiene-styrene copolymer, SBBS). Among these polymers, preferred are a hydrogenated styrene-isoprene/butadiene-styrene copolymer and/or a hydrogenated styrene-isoprene-styrene copolymer, in which at least 60% of the olefinically unsaturated bonds are hydrogenated.

Examples of the above-mentioned ethylene-based copolymer rubber (a-2) include an ethylene-α-olefin copolymer rubber, an ethylene-α-olefin-non-conjugated diene copolymer rubber and an ethylene-α-olefin copolymer synthesized in the presence of a single-site catalyst. Examples of α-olefins as the comonomer include propylene, 1-butene, 1-pentene, 1-hexene and 1-octene. Examples of non-conjugated dienes as the comonomer include dicyclopentadiene, 1,4-hexadiene, dicyclooctadiene, methylenenorbornene and 5-ethylidene-2-norbornene.

Among these, preferred is at least one member selected from the group consisting of an ethylene-propylene copolymer rubber, an ethylene-butene copolymer rubber, an ethylene-propylene-non-conjugated diene copolymer rubber and ethylene-α-olefin copolymer synthesized in the presence of a single-site catalyst. These polymers can be used individually or in combination.

It is preferred that compound (b) is a compound having at least one polar group selected from the group consisting of a carboxyl group, a carbonyl group, an acid anhydride group, an amino group, a hydroxyl group, a glycidyl group and an oxazolyl group. It is especially preferred that compound (b) is at least one compound selected from the group consisting of (b-1) an unsaturated carboxylic acid or a derivative thereof;
(b-2) a liquid polybutadiene having at least one terminal hydroxyl group; and
(b-3) an unsaturated glycidyl group-containing compound or a derivative thereof.

Each of the above-mentioned unsaturated carboxylic acid and derivative thereof as component (b-1) is used as a modifier. Examples of components (b-1) include acrylic acid, methacrylic acid, maleic acid, dicarboxylic acids and derivative thereof (such as an acid, a halide, an amide, an imide, an anhydride and an ester). Among these, maleic anhydride (MAH) is particularly preferable. This modifier modifies components (a), (d) and (e) (peroxide-decomposable polyolefin resin) so as to participate with improvement of the compatibility between thermoplastic elastomer (C) and urethane-based thermoplastic elastomer (A) by polar group-containing thermoplastic elastomer (B).

Component (b-1) is incorporated, when it is used, at 0.01 to 15 parts by weight, particularly preferably 0.1 to 10 parts by weight, per 100 parts by weight of component (a). At above 15 parts by weight, the resultant polar group-containing thermoplastic elastomer may turn yellow, have deteriorated resistance to deformation under heating and mechanical characteristics, and may no longer exhibit the effect of improving compatibility.

The liquid polybutadiene as component (b-2) having at least one terminal hydroxyl group exhibits the effect of controlling bleed-out of the low molecular weight component from the thermoplastic elastomer resin composition mainly by graft-polymerizing itself with component (a) in the presence of a peroxide, while the elastomer resin composition is molten. Further, component (b-2) improves the compatibility among the components of the thermoplastic elastomer resin composition. Component (b-2) is in the form of a transparent liquid polymer at room temperature, wherein the microstructure in the main chain is consisting of the vinyl 1,2-bond, trans 1,4-bond and cis 1,4-bond. It is preferred that the amount of the vinyl 1,2-bonds is 30% by weight or less. At above 30% by weight, the low-temperature characteristics of the resultant composition may be disadvantageously lowered.

This modifier modifies components (a), (b) and (e) (peroxide-decomposable polyolefin resin) so as to participate with improvement of the compatibility between thermoplastic elastomer (C) and urethane-based thermoplastic elastomer by polar group-containing thermoplastic elastomer (B).

The liquid polybutadiene as component (b-2) having at least one terminal hydroxyl group preferably has a number-average molecular weight of 1,000 to 5,000, more preferably 2,000 to 4,000. At a number-average molecular weight below 1,000, the resultant thermoplastic elastomer composition will have deteriorated resistance to deformation under heating. At above 5,000, on the other hand, the resultant thermoplastic elastomer composition will have deteriorated compatibility. It is commercially available (e.g., R-45HT™ supplied by Idemitsu Petrochemical Co., Ltd.).

When component (b-2) is used, component (b-2) is incorporated at 1 to 30 parts by weight, preferably 3 to 20 parts by weight, per 100 parts by weight of component (a). At above 30 parts by weight, the resultant polar group-containing thermoplastic elastomer is liable to suffer bleed-out of the softening agent, and the formed article is liable to suffer peeling, deformation and flow marks on the surfaces. Further, the resultant alloy is liable to suffer bleed-out of the softening agent. On the other hand, at below 1 parts by weight, the resultant polar group-containing thermoplastic elastomer may no longer exhibit improved softness and moldability. Further, the formed article obtained by molding the resultant alloy is liable to suffer peeling, deformation and flow marks on the surfaces.

The unsaturated glycidyl compound or derivative thereof as component (b-3) is used as the modifier. It preferably has, in the molecule, an unsaturated group capable of being copolymerized with an olefin and a glycidyl group. The particularly preferable glycidyl compound is glycidyl methacrylate (GMA). This modifier modifies components (a), (d) and (e) (peroxide-decomposable polyolefin resin) so as to participate with improvement of the compatibility between thermoplastic elastomer (C) and urethane-based thermoplastic elastomer (A) by polar group-containing thermoplastic elastomer (B).

Component (b-3) is incorporated, when it is used, at 0.01 to 15 parts by weight, particularly preferably 0.1 to 10 parts by weight, per 100 parts by weight of component (a). At above 15 parts by weight, the resultant thermoplastic elastomer may have deteriorated resistance to deformation under heating and mechanical characteristics, and may no longer exhibit the effect of improving compatibility with polar group-containing resin.

The organic peroxide as component (c) works to generate the radicals which are reacted with each other in a chain reaction manner to crosslink component (a). It also works to graft-polymerize the optional components with component (a), so as to improve the compatibility between urethane-based thermoplastic elastomer (A) and thermoplastic elastomer (C).

The compounds useful as component (c) include dicumyl peroxide, di-tert-butyl peroxide, 2,5-dimethyl-2,5-di(tert-butylperoxy)hexane, 2,5-dimethyl-2,5-di(tert-butylperoxy)hexyne-3, 1,3-bis(tert-butylperoxyisopropyl)benzene, 1,1-bis(tert-butylperoxy)-3,3,5-trimethylcyclohexane, 1,1-bis(t-hexylperoxy)-3,3,5-trimethylcyclohexane, n-butyl-4,4-bis(tert-butylperoxy)valerate, benzoyl peroxide, p-chlorobenzoyl peroxide, 2,4-dichlorobenzoyl peroxide, tert-butylperoxybenzoate, tert-butylperoxyisopropyl carbonate, diacetyl peroxide, lauroyl peroxide, and tert-butylcumyl peroxide. Of these, 2,5-dimethyl-2,5-di(tert-butylperoxy)hexane, 2,5-dimethyl-2,5-di(tert-butyl-peroxy)hexyne-3 and 1,1-bis(t-hexylperoxy)-3,3,5-trimethylcyclohexane are particularly preferable for their characteristics related to odor, coloring and scorch safety.

Component (c) is incorporated at 0.01 to 3.5 parts by weight, preferably 0.05 to 2.5 parts by weight, per 100 parts by weight of component (a). At below 0.01 parts by weight, crosslinking may be insufficiently achieved, and the heat resistance and oil resistance of the resultant thermoplastic elastomer compound of this invention may be lowered. Further, the moldability of the alloy of polar group-containing thermoplastic elastomer (B) with a resin containing a polar group is also lowered. At above 3.5 parts by weight, on the other hand, the mechanical characteristics and moldability of the resultant polar group-containing thermoplastic elastomer (B) may be lowered, and the resultant thermoplastic elastomer composition of this invention may have deteriorated moldability.

The non-aromatic-based softening agents for rubber as component (d) include a non-aromatic-based mineral oil, or liquid or low-molecular-weight synthetic agent. The softening agents of mineral oil for rubber are generally a mixture of an aromatic ring, naphthenic ring and paraffin chain. They are distinguished from each other by the paraffin-, naphthene- and aromatic-based ones, when carbons in the paraffin chains account for 50% or more of the total carbons, those in the naphthene rings for 30 to 40%, and the aromatic ones for 30% or more, respectively.

The softening agents of mineral oil for rubber useful as component (d) for the present invention are paraffin- or naphthene-based ones. Use of an aromatic-based softening agent is undesirable, because it will make component (a) soluble to retard the crosslinking reactions with the result that properties of the resultant composition may not be improved. Component (d) for the present invention is preferably a paraffin-based one, and the one having a lower aromatic ring content is more preferable.

Examples of liquid or low-molecular-weight synthetic softening agents include a polybutene, a hydrogenated polybutene and a low-molecular-weight polyisobutylene.

The non-aromatic-based softening agent for rubber preferably has a kinematic viscosity of 20 to 50,000 cSt at 37.8° C. and 5 to 1,500 cSt at 100° C., pour point of −10 to −15° C., and flash point (COC) of 170 to 300° C. Moreover, it preferably has a weight-average molecular weight of 100 to 2,000.

Component (d) is incorporated, when a diene-based rubber or a styrene-based rubber is used as component (a), at 20 to 240 parts by weight, preferably 80 to 200 parts by weight, more preferably 100 to 150 parts by weight, per 100 parts by weight of component (a). At above 240 parts by weight, the resultant thermoplastic elastomer composition is liable to suffer bleed-out of the softening agent from the resultant polar group-containing thermoplastic elastomer, and the formed article is liable to suffer peeling, deformation and flow marks on the surfaces.

Component (d) is incorporated, when an olefin-based rubber is used as component (a), at 10 to 200 parts by weight, preferably 15 to 150 parts by weight, more preferably 20 to 100 parts by weight, per 100 parts by weight of component (a). At above 200 parts by weight, the resultant polar group-containing thermoplastic elastomer composition is liable to suffer bleed-out of the softening agent, and the formed article is liable to suffer peeling from the resultant polar group-containing thermoplastic elastomer, deformation and flow marks on the surfaces.

The above-mentioned peroxide-decomposable polyolefin resin (e) is effective for dispersing the rubber in the resultant polar group-containing thermoplastic elastomer and controlling the hardness and shrinkage factor of the polar group-containing thermoplastic elastomer. Component (e) is composed of an olefin-based polymer or copolymer, thermally decomposed under heating in the presence of a peroxide to lose its molecular weight and have increased fluidity while being molten. The resin useful for component (e) include copolymers of isotactic polypropylene or propylene with another α-olefin, e.g., ethylene, 1-butene, 1-hexene, 4-methyl-1-pentene or 1-octene.

The homopolymer portion of the above olefin-based copolymer preferably has a DSC-determined melting point (Tm) of 150 to 167° C., and ΔHm of 25 to 83 mJ/mg. Degree of crystallinity can be estimated from the DSC-determined Tm and ΔHm. The resultant thermoplastic elastomer composition containing an olefin-based copolymer with a homopolymer portion having the Tm or ΔHm out of the above range may no longer exhibit improved resistance to oil and rubber elasticity at 100° C. or higher.

Component (e) preferably has a melt flow rate (MFR, determined at 230° C. in accordance with ASTM D-1238, L conditions) of 0.1 to 200 g/10 minutes, more preferably 0.5 to 100 g/10 minutes. At an MFR below 0.1 g/10 minutes, the resultant thermoplastic elastomer composition may have deteriorated moldability. At above 200 g/10 minutes, on the other hand, it may have deteriorated rubber elasticity of the resultant polar group-containing.

Component (e) is incorporated at 1 to 100 parts by weight, preferably 5 to 50 parts by weight per 100 parts by weight of component (a). At above 100 parts by weight, the resultant thermoplastic elastomer composition may have deteriorated moldability, and the formed article is liable to suffer peeling, deformation and flow marks on the surfaces. Further, the resultant polar group-containing thermoplastic elastomer composition may have excessively high hardness and deteriorated softness with the result that the composition may not give the rubber-touch product.

Examples of the above-mentioned peroxide-crosslinkable polyolefin resin (f) include a polyethylene (such as a high-density polyethylene, a medium-density polyethylene, a low-density polyethylene and a linear low-density polyethylene), an ethylene-vinyl acetate copolymer and an ethylene-acrylic ester copolymer. These polymers can be used individually or in combination.

Component (f) preferably has a melt flow rate (MFR, determined at 190° C. in accordance with ASTM D-1238, L conditions) of 0.1 to 100 g/10 minutes, more preferably 0.5 to 50 g/10 minutes. At an MFR below 0.1 g/10 minutes, the resultant thermoplastic elastomer composition may have deteriorated moldability. At above 100 g/10 minutes, on the other hand, the resultant polar group-containing thermoplastic elastomer composition may have deteriorated rubber elasticity.

Component (f) is incorporated at 0 to 100 parts by weight, preferably 5 to 50 parts by weight per 100 parts by weight of component (a). At above 100 parts by weight, the resultant thermoplastic elastomer composition may have deteriorated moldability, and the formed article is liable to suffer peeling, deformation and flow marks on the surfaces. Further, the resultant polar group-containing thermoplastic elastomer composition may have excessively high hardness and deteriorated softness with the result that the composition may not give the rubber-feel product.

The ester-based crosslinking aid as component (g) may be incorporated during the crosslinking step in the presence of the organic peroxide as component (c) in the production of the polar group-containing thermoplastic elastomer composition of the present invention, for the uniform and efficient crosslinking reactions. When used in a large quantity, it can adequately crosslink the non-aromatic-based softening agent for rubber, in particular low-molecular-weight paraffin-based oil, to control its bleed-out from the polar group-containing thermoplastic elastomer composition and its alloy.

The compounds useful for component (g) include triallyl cyanurate; multi-functional methacrylate compounds, e.g., ethylene glycol dimethacrylate, diethylene glycol dimethacrylate, triethylene glycol dimethacrylate, tetraethylene glycol dimethacrylate, polyethylene glycol dimethacrylate having 9 to 14 repeating units of ethylene glycol, trimethylolpropane trimethacrylate, allyl methacrylate, 2-methyl-1,8-octanediol dimethacrylate and 1,9-nonanediol dimethacrylate; multi-functional acrylate compounds, e.g., polyethylene glycol diacrylate, 1,6-hexanediol diacrylate, trimethylolpropane tetraacrylate, dipentaerythritol polyacrylate, neopentyl glycol diacrylate and propylene glycol diacrylate; and multi-functional vinyl compounds, e.g., vinyl butylate and vinyl stearate. They may be used either individually or in combination. Of these crosslinking aids, triethylene glycol dimethacrylate, tetraethylene glycol dimethacrylate, trimethylolpropane trimethacrylate, trimethylol-propane tetraacrylate and dipentaerythritol polyacrylate are still more preferable.

Component (g) is incorporated, when it is used, preferably at 0.1 to 50 parts by weight, more preferably 0.1 to 20 parts, per 100 parts by weight of component (a). At above 50 parts by weight, it may no longer exhibit its effect, because it has a decreased extent of crosslinking due to the self-polymerization.

The above-mentioned component (B) can be produced by melt-kneading the above-mentioned components (a) to (c), and, as required, optional components (d) to (g).

The melting/kneading method is not limited, and the known method may be used. For example, these components may be melt-kneaded by a single-screw extruder, twin-screw extruder, roll, Banbury mixer, or various types of kneaders. The melt-kneading step may be effected continuously by, e.g., a twin-screw extruder of adequate L/D ratio, Banbury mixer or kneader operating at an elevated pressure. The preferable melting/kneading temperature is 160 to 220° C.

Component (B) is incorporated in an amount of 5 to 45% by weight, preferably 5 to 35% by weight, based on the total weight of components (A), (B) and (C) taken as 100% by weight. At below 5% by weight, the abrasion resistance is lowered.

(3) Thermoplastic Elastomer (C)

Thermoplastic elastomer (C) used in the present invention is limited to a thermoplastic elastomer having no polar group. By using thermoplastic elastomer (C) together with polar group-containing thermoplastic elastomer (B), it becomes possible to impart a softness to urethane-based thermoplastic elastomer (A) and improve the moldability of urethane-based thermoplastic elastomer (A). Further, the use of thermoplastic elastomer (C)-is advantageous from the economical viewpoint.

As thermoplastic elastomer (C), preferred is at least one thermoplastic elastomer selected from the group consisting of an olefin-based thermoplastic elastomer (C-1) and a styrene-based thermoplastic elastomer (C-2).

Examples of the above-mentioned olefin-based thermoplastic elastomers (C-1) include an ethylene-propylene copolymer, an ethylene-propylene-non-conjugated diene copolymer, an ethylene-1-butene copolymer, an ethylene-1-butene-non-conjugated diene copolymer, an ethylene-propylene-1-butene copolymer, ethylene-α-olefin copolymer synthesized in the presence of a single-site catalyst for example an ethylene-hexene copolymer (synthesized in the presence of a single-site catalyst) and an ethylene-octene copolymer (synthesized in the presence of a single-site catalyst). Among these, preferred is at least one member selected from the group consisting of an ethylene-propylene copolymer, an ethylene-butene copolymer and ethylene-α-olefin copolymer synthesized in the presence of a single-site catalyst. These polymers can be used individually or in combination.

A non-aromatic-based softening agent for rubber, a peroxide-decomposable polyolefin resin, a peroxide-crosslinkable polyolefin resin and the like may be added to olefin-based thermoplastic elastomers (C-1). Further, olefin-based thermoplastic elastomers (C-1) may contain a crosslinking agent.

The advantage of the use of olefin-based thermoplastic elastomer (C-1) as component (C) is the improvement of the moldability of the resultant resin composition. When olefin-based thermoplastic elastomer (C-1) is used as component (C), the moldability of the resultant resin composition is higher than that of the resin composition obtained using styrene-based thermoplastic elastomer (C-2) as component (C). As a result, the degree of freedom with respect to the shape of the molded article obtained by injection molding becomes high.

It is preferred that the above-mentioned styrene-based thermoplastic elastomer (C-2) is at least one member selected from the group consisting of:

a block copolymer comprising at least one polymer block A composed mainly of an aromatic vinyl compound and at least one polymer block B composed mainly of a conjugated diene compound, and a hydrogenated block copolymer obtained by hydrogenating such a block copolymer.

The examples of the block copolymers as component (C-2), each comprising at least one polymer block A composed mainly of an aromatic vinyl compound and at least one polymer block B composed mainly of a conjugated diene compound, and hydrogenated block copolymer include block copolymers of an aromatic vinyl compound and conjugated diene compound, having the structure of A-B, A-B-A, B-A-B-A or A-B-A-B-A and hydrogenated block copolymers obtained by hydrogenating block copolymer above.

The above-mentioned block copolymer contains an aromatic vinyl compound in an amount of from 5 to 60% by weight, preferably from 20 to 50% by weight The polymer block A composed mainly of an aromatic vinyl compound may be composed only of the aromatic vinyl compound, or a copolymer block composed of an aromatic vinyl compound and a conjugated diene compound, wherein the amount of the aromatic vinyl compound in the copolymer block is 50% by weight or more, preferably 70% by weight or more.

The polymer block B composed mainly of a conjugated diene compound may be composed only of the conjugated diene compound, or a copolymer block composed of a conjugated diene compound and an aromatic vinyl compound, wherein the amount of the conjugated diene compound in the copolymer block is 50% by weight or more, preferably 70% by weight or more.

The block copolymer preferably has a number-average molecular weight (Mn) of 5,000 to 1,500,000, more preferably 10,000 to 550,000, still more preferably 100,000 to 400,000. The molecular weight distribution (Mw/Mn) is 10 or less. The molecular structure of the block copolymer may be of straight-chain, branched-chain, radial-chain or of an optional combination thereof.

In each of the polymer block A composed mainly of an aromatic vinyl compound and polymer block B composed mainly of a conjugated diene compound, the distribution of the aromatic vinyl compound or conjugated diene compound in the molecular chain may be represented by random, tapered configuration (the term "tapered configuration" means a configuration such that the concentration of certain monomer units contained in the polymer block does increasingly or decreasingly change along the length of the polymer chain), partial block or an combination thereof.

When there are 2 or more polymer blocks A composed mainly of an aromatic vinyl compound, they may be structurally the same or different, and so are polymer blocks B composed mainly of a conjugated diene compound.

Examples of the aromatic vinyl compounds useful for constructing the block copolymer include styrene, α-methylstyrene, vinyltoluene and p-tert-butyl-styrene. They may be used either individually or in combination. Of the above compounds, styrene is more preferable. Examples of the conjugated diene compounds useful for constructing the block copolymer include butadiene, isoprene, 1,3-pentadiene and 2,3-dimethyl-1,3-butadiene. They may be used either individually or in combination. Of the above compounds, butadiene, isoprene and a mixture of these compounds are more preferable.

The polymer block B mainly based on a conjugated diene compound for the hydrogenated block copolymer as component (C-2) is not limited in extent of hydrogenation. However, it is preferably 50% or more, more preferably 55% or more, still more preferably 60% or more. Its micro structure is also not limited. When the block B is composed of butadiene, for example, the 1,2-micro structure preferably accounts for 20 to 50% by weight, particularly preferably 25 to 45% by weight, in the polybutadiene block. The 1,2-bond may be selectively hydrogenated for the block. When the block B is composed of isoprene, preferably 70 to 100% by weight of isoprene in the polyisoprene block has the 1,4-microstructure, and preferably 90% or more of the aliphatic double bond derived from isoprene is hydrogenated.

When the hydrogenated block copolymer is used for specific purposes, the hydrogenated compound above can be preferably used, as required, for the purposes.

Specific examples of the above-mentioned block copolymers include a styrene-butadiene-styrene copolymer (SBS) and a styrene-isoprene-styrene copolymer (SIS). Specific examples of the above-mentioned hydrogenated block copolymers include a styrene-ethylene/butene-styrene copolymer (SEBS), a styrene-ethylene/propylene-styrene copolymer (SEPS), a styrene-ethylene/ethylene/propylene-styrene copolymer (SEEPS) (i.e., a hydrogenated styrene-butadiene/isoprene-styrene copolymer) and a styrene-butadiene/butylene-styrene copolymer (i.e., a partially hydrogenated styrene-butadiene-styrene copolymer, SBBS).

Among these, preferred is a hydrogenated copolymer obtained by hydrogenating a styrene-isoprene/butadiene-styrene block copolymer and/or styrene-isoprene-styrene block copolymer, in which at least 60% of the olefinically unsaturated bonds are hydrogenated.

Component (C) is incorporated in an amount of 5 to 45% by weight, preferably 5 to 35% by weight, based on the total weight of components (A), (B) and (C) taken as 100% by weight. At below 5% by weight, the moldability is not satisfactorily improved.

(4) Inorganic Filler (D)

If desired, an inorganic filler (D) can be added to the thermoplastic elastomer resin composition of the present invention. Inorganic filler (D) improves some properties (such as permanent compression set) of the shaped article obtained by molding the thermoplastic elastomer resin composition of the present invention. Further, the filling by the use of inorganic filler (D) is advantageous from an economical viewpoint. Examples of materials usable as component (D) include wollastonite, chlorite, calcium carbonate, talc, silica, diatomaceous earth, barium sulfate, magnesium carbonate, magnesium hydroxide, mica, clay, titanium oxide, carbon black, glass fiber, hollow glass balloon, carbon fiber, calcium titanate fiber, natural silicic acid and synthetic silicic acid (white carbon). Among these, especially preferred are calcium carbonate, wollastonite, chlorite and talc.

Component (D) is incorporated at 1 to 50 parts by weight, preferably 5 to 40 parts by weight, based on the total weight of components (A), (B) and (C) taken as 100 parts by weight. At above 50 parts by weight, the mechanical strength of the resultant thermoplastic elastomer composition may be disadvantageously lowered. Further, the resultant thermoplastic elastomer composition may have excessively high hardness and deteriorated softness with the result that the composition may not give the rubber-feel product.

(5) Other Components (E)

The thermoplastic elastomer resin composition of the present invention may be incorporated with other optional components, as required. These optional components include a blocking inhibitor, sealing improver, heat stabilizer, antioxidant, light stabilizer, ultraviolet ray absorber, lubricant, nucleating agent and colorant.

The antioxidants useful for the present invention include phenol-based antioxidants, e.g., 2,6-di-tert-p-butyl-p-cresol, 2,6-di-tert-butyl phenol, 2,4-dimethyl-6-tert-butylphenol, 4,4-dihydroxydiphenyl and tris(2-methyl-4-hydroxy-5-tert-butylphenyl)butane; phosphite-based antioxidants; and thioether-based antioxidants. Of these, phenol- and phosphite-based antioxidants are particularly preferable.

The antioxidant is incorporated at 0 to 3.0 parts by weight, preferably 0.01 to 1.0 parts by weight, based on the total weight of components (A), (B) and (C) taken as 100 parts by weight.

2. Method of Producing the Thermoplastic Elastomer Resin Composition

The thermoplastic elastomer resin composition of the present invention can be produced by melt-kneading components (A) to (C), and, as required, optional components (D) to (E), which may be incorporated simultaneously or in an optional sequence.

Component (B) may be produced prior to or during the production of the thermoplastic elastomer resin composition of the present invention by melt-kneading components (a) to (c), and, as required, optional components (d) to (g).

The melt-kneading method is not limited, and a known method may be used. For example, the melt-kneading may be conducted by a method using a single-screw extruder, twin-screw extruder, roll, Banbury mixer or one of various types of kneaders. The operation can be continuously conducted by a twin-screw extruder of adequate L/D ratio, Banbury mixer, kneader operating at an elevated pressure or the like. The preferable melt-kneading temperature is 160 to 220° C.

3. Use of the Thermoplastic Elastomer Resin Composition

The thermoplastic elastomer resin composition of the present invention has excellent touch and high scratch resistance. Therefore, when the thermoplastic elastomer resin composition of the present invention is molded mainly by injection molding, the resultant molded article can be advantageously used as a part to be touched by a human hand, such as a grip, a switch, an arm rest, a skin, a buckle, a cushioning medium and the like.

Specifically, examples of grips include grips of tools, such as a screwdriver, pliers, pincers and a saw; a grip of a toolbox; an automobile part, such as a parking break cover, a steering wheel, a door, a shift knob and a grab-rail; a non-skid grip of stationary products, such as a stamp grip and a pen grip; a device of a handrail to prevent slipping; a device of a door knob to prevent slipping; a grip of a shower head, a grip of a skipole, a grip of a fishing rod, a part of a bicycle, such as a grip shift and a grip; a grip of a stick; cosmetic and health articles, such as a hand grip; and parts of a camera and binocular.

Examples of switches include a part of a cellular phone; a part of electric appliances, such as a remote controller; and a part of a camera and binocular, such as a soft-touch switch button, a button switch and a focus ring.

Examples of arm rests include an arm rest of a chair and a glove compartment.

Examples of skins include a skin material of an interior part; a console box; an instrument panel; an interior or exterior part of an automobile, such as a switch button on an instrument panel and a console box; a body and a part of a camera and binocular, such as a button switch and a focus ring.

Examples of buckles include buckles of ski boots, bags and suitcases.

Examples of cushioning media include an eyecap of a video camera; a bumper of a home electric appliance, such as a cleaner; a part of a furniture, such as an edge material; a body and band of a watch; and a cushioning medium (and a device to prevent slipping) for glasses and sunglasses.

EXAMPLES

The present invention is described in more detail by EXAMPLES and COMPARATIVE EXAMPLES, which by no means limit the present invention. Method for determining the properties of a composition and samples are described below.

1. Method for Determining the Properties of a Composition
(1) Hardness (shore A): Hardness was determined in accordance with JIS K-6253 for the 6.3-mm thick pressed sheet.
(2) Moldability: A 90 by 40 mm notched plate was obtained by injection-molding, and the appearance (such as presence of flow marks, sink marks and the like) of the obtained plate was visually observed, to determine its moldability according to the following standards:
◯: No sink marks and uniform in gloss
Δ: No sink marks or uniform in gloss
x: Sink marks and uneven in gloss
(3) Scratch resistance: Taber-volume loss was determined in accordance with JIS K-7204 for a 2-mm thick pressed sheet using a truck wheel CS-10 (load: 1 kg) after 1000 revolution, and the scratch resistance was evaluated according to the following standards:
◯: Less than 30 mm$^3$
Δ: 30 to 100 mm$^3$
x: 100 mm$^3$ or more 2. Samples Used in EXAMPLES and COMPARATIVE EXAMPLES
(1) Urethane-based thermoplastic elastomer (A-1): T-8180 (manufactured and sold by DIC Bayer Polymer Ltd.)
(2) Urethane-based thermoplastic elastomer (A-2): T-8283 (manufactured and sold by DIC Bayer Polymer Ltd.)
(3) Hydrogenated block copolymer as component (a-1): SEPTON 4077 (SEEPS; manufactured and sold by Kuraray Co., Ltd.), Styrene content: 30% by weight, Number-average molecular weight: 260,000, Weight-average molecular weight: 320,000, Molecular weight distribution: 1.23, Degree of hydrogenation: 90% or more
(4) Ethylene-propylene copolymer as component (a-2): W0741 (EPR; manufactured and sold by Sumitomo Chemical Co., Ltd.)
(5) Unsaturated carboxylic acid as component (b-1): maleic anhydride (manufactured and sold by Kanto Kagaku)
(6) Liquid polybutadiene having at least one terminal hydroxyl group as component (b-2): R-45HT (manufactured and sold by Idemitsu Petrochemical Co., Ltd.)
(7) Unsaturated glycidyl group-containing compound as component (b-3): glycidyl methacrylate (manufactured and sold by Kanto Kagaku)
(8) Organic peroxide as component (c): PERHEXA 25B (2,5-dimethyl-2,5-di(tert-butylperoxy)hexane; manufactured and sold by NOF Corp.)
(9) Non-aromatic softening agent as component (d): Diana Process Oil PW-90 (Mineral oil; manufactured and sold by Idemitsu Kosan Co., Ltd.)
(10) Peroxide-decomposable olefin-based resin as component (e): CJ-700 (propylene homopolymer (PP); manufactured and sold by Mitsui Chemicals, Inc.), Tm: 166° C., ΔHm: 82 mJ/mg
(11) Ester-based crosslinking agent as component (h): NK ESTER 3G (triethylene glycol dimethacrylate; manufactured and sold by Shin-Nakamura Chemical Co., Ltd.)
(12) Ethylene-propylene copolymer as component (C-1-1): W0741 (EPR; manufactured and sold by Sumitomo Chemical Co., Ltd.)
(13) Ethylene-butene copolymer as component (C-1-2): N0441 (EBR; manufactured and sold by Sumitomo Chemical Co., Ltd.)
(14) Ethylene-octene copolymer as component (C-1-3): ENGAGE EG8200 ($C_2$-$C_8$; manufactured and sold by The Dow Chemical Company)
(15) Styrene-based thermoplastic elastomer as component (C-2-1): SEPTON 2002 (SEPS; manufactured and sold by Kuraray Co., Ltd.), Styrene content: 30% by weight, Number-average molecular weight: 50,000, Weight-average molecular weight: 65,000, Molecular weight distribution: 1.1, Degree of hydrogenation: 90% or more
(16) Inorganic filler as component (D): NS400 (calcium carbonate; manufactured and sold by Sankyo Seifun Co., Ltd.)

Examples 1 to 8, and Comparative Examples 1 to 3

The components shown in Table 1 were melt-kneaded by a twin-screw extruder (L/D: 47) at 180° C. and at the screw speed of 350 rpm to thereby obtain polar group-containing thermoplastic elastomers (B-1) to (B-3). Then, the components shown in Table 2 were melt-kneaded into pellets by a twin-screw extruder (L/D: 47) at 180° C. and at the screw speed of 350 rpm. The resultant pellets were injection-molded to prepare the test pieces which were tested for various characteristics. The results are given in Table 2.

TABLE 1

| | (B) Polar group-containing thermoplastic elastomer | | |
|---|---|---|---|
| Components | B-1 Parts by weight | B-2 Parts by weight | B-3 Parts by weight |
| SEEPS (a-1) | 100 | — | 100 |
| EPR (a-2) | — | 100 | — |
| Maleic anhydride (b-1) | 5 | 2 | 5 |
| Liquid polybutadiene (b-2) | 0 | 0 | 15 |
| Glycidyl methacrylate (b-3) | 0 | 0 | 5 |
| Peroxide (c) | 2.0 | 0.2 | 1.0 |
| PW-90 (d) | 130 | 50 | 130 |
| PP (e) | 20 | 5 | 20 |
| NK ester (g) | 0 | 0 | 2.0 |

TABLE 2

| | | | | Examples | | | | | | | | | | Comparative Examples | | |
|---|---|---|---|---|---|---|---|---|---|---|---|---|---|---|---|---|
| | | | | 1 | 2 | 3 | 4 | 5 | 6 | 7 | 8 | 9 | 10 | 1 | 2 | 3 |
| Thermoplastic elastomer resin composition | Component (A) | TPU (A-1) | wt % | 65 | 65 | 65 | 65 | 65 | 35 | 60 | 70 | 65 | 65 | 95 | 45 | 65 |
| | | TPU (A-2) | wt % | — | — | — | — | — | 30 | — | — | — | — | — | — | — |
| | Component (B) | (B-1) | wt % | 20 | 20 | 20 | — | — | 20 | 15 | 10 | 20 | — | 5 | 30 | — |
| | | (B-2) | wt % | — | — | — | 20 | — | — | — | — | — | 20 | — | — | — |
| | | (B-3) | wt % | — | — | — | — | 20 | — | — | — | — | — | — | — | — |
| | Component (C) | EPR (C-1-1) | wt % | 15 | — | — | — | — | — | — | — | — | — | — | — | — |
| | | EBR (C-1-2) | wt % | — | 15 | — | 15 | 15 | 15 | 15 | 20 | — | — | — | 25 | 35 |
| | | $C_2$–$C_8$ (C-1-3) | wt % | — | — | 15 | — | — | — | — | — | — | — | — | — | — |
| | | SEPS (C-2) | wt % | — | — | — | — | — | — | — | — | 15 | 15 | — | — | — |
| | Component (D) | $CaCO_3$ (D) | wt % | — | — | — | — | — | — | 10 | — | — | — | — | — | — |
| Evaluations | | Hardness | — | 69 | 70 | 70 | 70 | 71 | 71 | 71 | 71 | 71 | 71 | 78 | 60 | 69 |
| | | Moldability | — | ○ | ○ | ○ | ○ | ○ | ○ | ○ | ○ | ○ | ○ | X | ○ | ○ |
| | | Scratch resistance | — | ○ | ○ | ○ | ○ | ○ | ○ | ○ | ○ | ○ | ○ | ○ | X | X |

As shown in Table 2, each of the thermoplastic elastomer resin compositions of the present invention prepared in EXAMPLES 1 to 8 has good properties.

Both component (a-1) of component (B) and component (C-2-1) of component (C) used in EXAMPLE 9 are styrene-based copolymers. For this reason, the components of the composition of EXAMPLE 9 are highly compatible with each other, so that the composition of EXAMPLE 9 exhibits especially high abrasion resistance.

With respect to the composition of EXAMPLE 10, polar groups are introduced not only to ethylene-propylene copolymer (a-2) but also to a softening agent for rubber and a peroxide-decomposable olefin-based resin. For this reason, the components of the composition of EXAMPLE 10 are highly compatible with each other, so that the composition of EXAMPLE 9 exhibits especially high abrasion resistance and especially low bleeding properties. Further, in EXAMPLE 10, styrene-based thermoplastic elastomer (C-2) is used as component (C), so that bleed-out of the softening agent hardly occurs. For this reason, the amount of the softening agent as component (d) in component (B) can be increased so as to obtain a product having lower hardness.

On the other hand, a composition containing no thermoplastic elastomer (C) (COMPARATIVE EXAMPLE 1) exhibits low moldability. A composition in which the amount of urethane-based thermoplastic elastomer (A) is outside of the range of the present invention (COMPARATIVE EXAMPLE 2) exhibits low scratch resistance. A composition containing no polar group-containing thermoplastic elastomer (B) (COMPARATIVE EXAMPLE 1) exhibits low scratch resistance.

The thermoplastic elastomer resin composition of the present invention, which comprises a urethane-based thermoplastic elastomer and a thermoplastic elastomer, has excellent moldability, oil resistance, scratch resistance and softness, especially excellent touch and high scratch resistance. Therefore, when the thermoplastic elastomer resin composition of the present invention is molded mainly by injection molding, the resultant molded article can be advantageously used as a part to be touched by a human hand.

What is claimed is:

1. A thermoplastic elastomer resin composition comprising:
    (A) 50 to 90% by weight of a urethane-based thermoplastic elastomer;
    (B) 5 to 45% by weight of a polar group-containing thermoplastic elastomer comprising a melt-kneaded mixture comprising (a), (b), (c) and at least one of (d) and (e), wherein (a)–(e) are as follows:
        (a) 100 parts by weight of a rubber elastomer;
        (b) at least one compound selected from the group consisting of:
            (b-1) 0.01 to 15 parts by weight of an unsaturated carboxylic acid or a derivative thereof,
            (b-2) 1 to 30 parts by weight of a liquid polybutadiene having at least one terminal hydroxyl group, and
            (b-3) 0.01 to 15 parts by weight of an unsaturated glycidyl group-containing compound or a derivative thereof;
        (c) 0.01 to 3.5 parts by weight of an organic peroxide;
        (d) 20 to 240 parts by weight of a non-aromatic-based softening agents for rubber;
        (e) 1 to 100 parts by weight of a peroxide-decomposing polyolefin resin; and
    (C) 5 to 45 % by weight of a thermoplastic elastomer.

2. The composition according to claim 1, wherein said rubber elastomer (a) is at least one member selected from the group consisting of:
    (a-1) at least one block copolymer selected from the group consisting of:
        a block copolymer comprising at least one polymer block A composed mainly of an aromatic vinyl compound and at least one polymer block B composed mainly of a conjugated diene compound, and
        a hydrogenated block copolymer obtained by hydrogenating said block copolymer; and
    (a-2) an ethylene-based copolymer rubber.

3. The composition according to claim 2, wherein said block copolymer (a-1) satisfy the following requirements:
    the content of the aromatic vinyl compound is 50% by weight or less;
    the number average molecular weight Mn is 5,000 to 1,500,000; and
    the molecular weight distribution (Mw/Mn) is 10 or less.

4. The composition according to claim 2, wherein said hydrogenated block copolymer (a-1) obtained by hydrogenating at least one block copolymer selected from the group consisting of a styrene-isoprene/butadiene-styrene block copolymer and a styrene-isoprene-styrene block copolymer, in which the hydrogenation ratio of the olefinically unsaturated bond is 60% or more.

5. The composition according to claim 2, wherein said copolymer (a-2) is an ethylene-$\alpha$-olefin copolymer rubber.

6. The composition according to claim 2, wherein said copolymer (a-2) is a rubber elastomer selected from the group consisting of an ethylene-propylene copolymer rubber, an ethylene-butene copolymer rubber, an ethylene-propylene-diene copolymer rubber and an ethylene-$\alpha$-olefin copolymer synthesized in the presence of a single-site catalyst.

7. The composition according to claim 1, wherein said elastomer (B) further comprises, per 100 parts by weight of said rubber elastomer (a),
(f) 0 to 100 parts by weight of a peroxide-crosslinkable polyolefin resin.

8. The composition according to claim 1, wherein said thermoplastic elastomer (C) is at least one thermoplastic elastomer selected from the group consisting of (C-1) an olefin-based elastomer and (C-2) a styrene-based elastomer.

9. The composition according to claim 8, wherein said olefin-based elastomer (C-1) is an ethylene-$\alpha$-olefin copolymer rubber.

10. The composition according to claim 8 or 9, wherein said olefin-based elastomer (C-1) is at least one member selected from the group consisting of an ethylene-propylene copolymer rubber, an ethylene-butene copolymer rubber and an ethylene-$\alpha$-olefin copolymer synthesized in the presence of a single-site catalyst.

11. The composition according to claim 8, wherein said styrene-based elastomer (C-2) is at least one member selected from the group consisting of a styrene-butadiene-styrene copolymer (SBS), a styrene-isoprene-styrene copolymer (SIS), a styrene-isoprene/butadiene-styrene copolymer (SIBS), a styrene-ethylene/butene-styrene copolymer (SEBS), styrene-ethylene/propylene-styrene copolymer (SEPS), a styrene-ethylene/ethylene/propylene-styrene copolymer (SEEPS) and a partially hydrogenated styrene-butadiene-styrene copolymer (SBBS).

12. A shaped article formed by molding the composition of claim 1.

13. A grip comprising the shaped article of claim 12.

14. A switch comprising the shaped article of claim 12.

15. An arm rest comprising the shaped article of claim 12.

16. A skin comprising the shaped article of claim 12.

17. A buckle comprising the shaped article of claim 12.

18. A cushioning medium comprising the shaped article of claim 12.

* * * * *